(12) United States Patent
Putumbaka et al.

(10) Patent No.: US 7,296,325 B1
(45) Date of Patent: Nov. 20, 2007

(54) HINGE MEMBERS AND HINGE ASSEMBLIES

(75) Inventors: Ramu Putumbaka, Farmington Hills, MI (US); Steven C. Battle, Walled Lake, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 34 days.

(21) Appl. No.: 10/128,110

(22) Filed: Apr. 23, 2002

(51) Int. Cl.
*E05D 15/06* (2006.01)

(52) U.S. Cl. .............................. 16/361; 16/357; 16/348; 180/69.21

(58) Field of Classification Search .................. 16/361, 16/246, 225, 357, 360, 348; 180/69.2, 69.21; 296/193.11
See application file for complete search history.

(56) References Cited

U.S. PATENT DOCUMENTS

| | | | | |
|---|---|---|---|---|
| 1,793,946 A | * | 2/1931 | McEwan | 105/375 |
| 2,167,489 A | * | 7/1939 | Renga | 16/357 |
| 2,219,918 A | * | 10/1940 | Economides | 16/260 |
| 3,231,927 A | * | 2/1966 | Ammon | 16/331 |
| 3,251,089 A | * | 5/1966 | Fergison | 16/246 |
| 3,881,221 A | * | 5/1975 | Schmidt | 16/366 |
| 4,839,941 A | | 6/1989 | Orlando | 16/361 |
| 4,848,840 A | * | 7/1989 | Toya | 297/411.32 |
| 4,882,807 A | * | 11/1989 | Frye et al. | 16/225 |
| 4,999,876 A | * | 3/1991 | Nass | 16/236 |
| 5,186,349 A | * | 2/1993 | Sakamoto | 220/812 |
| 5,669,107 A | * | 9/1997 | Carlsen et al. | 16/348 |
| 6,125,030 A | * | 9/2000 | Mola et al. | 361/681 |
| 6,442,801 B1 | * | 9/2002 | Kim | 16/361 |

* cited by examiner

*Primary Examiner*—William L. Miller
(74) *Attorney, Agent, or Firm*—Peter D. McDermott; Banner & Witcoff Ltd.; Dean B. Watson

(57) ABSTRACT

A hinge member comprises a mounting portion to be secured to a vehicle body panel, and an extension portion having a fixed orientation relative to the mounting portion. The extension portion has a pivot-receiving slot defining a hinge pivot hole to receive a hinge pivot, and a slot portion extending from the hinge pivot hole. At least a portion of the pivot-receiving slot has a lateral dimension smaller than a diameter of the pivot hole. A hinge assembly includes a first hinge member pivotally joined to a second hinge member by a hinge pivot having a hinge pivot pin in a pivot pin bushing. Preferably, the pivot pin bushing shears under a pre-selected level of force or load to permit the pivot pin to be slidingly received in the slot. Embodiments of the hinge assemblies are well suited for hingedly mounting motor vehicle body panels to the vehicle body.

23 Claims, 3 Drawing Sheets

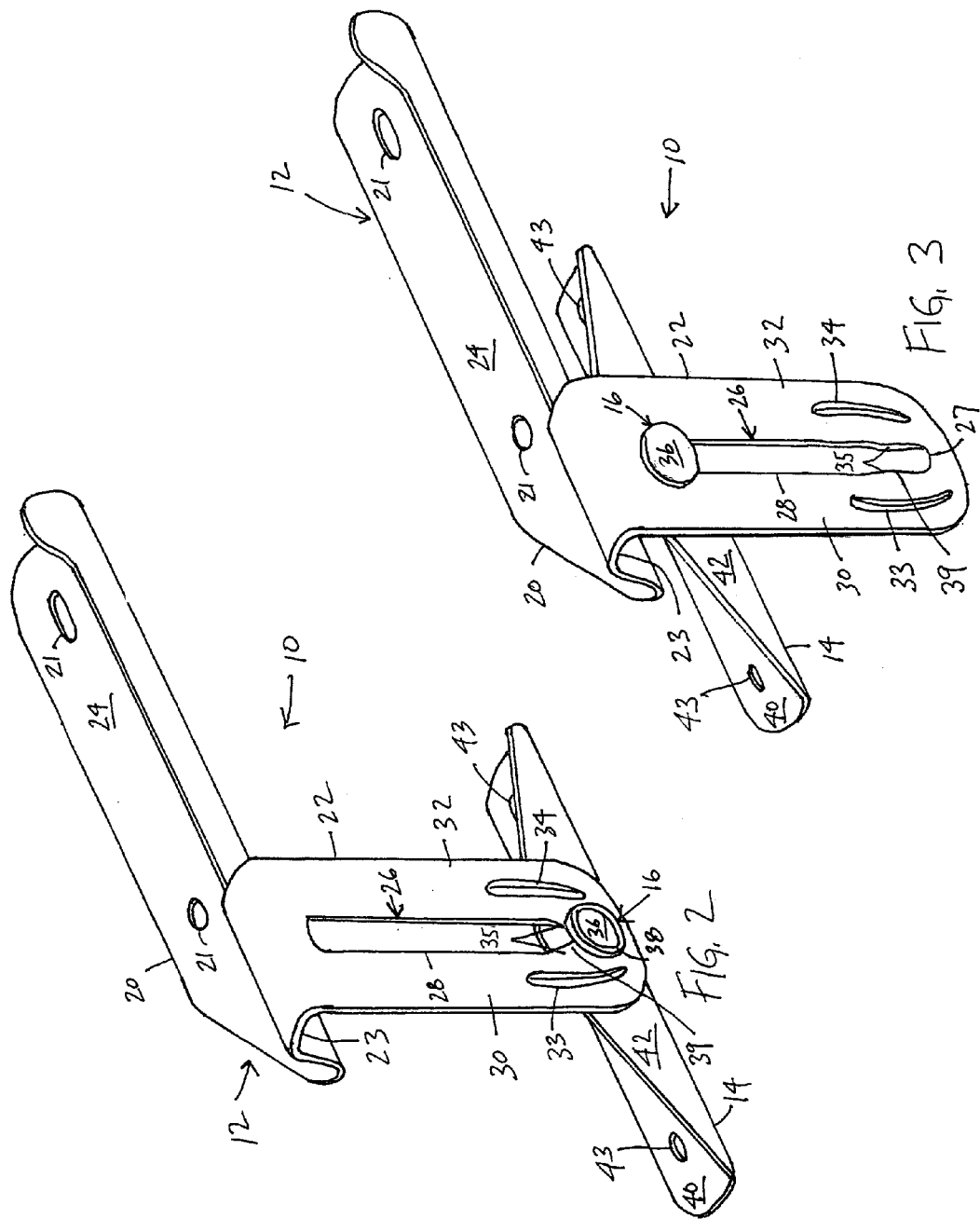

HINGE MEMBERS AND HINGE ASSEMBLIES

TECHNICAL FIELD

This disclosure relates to the field of hinges and, in particular, to hinge members and hinge assemblies responsive to certain applied forces. Preferred embodiments are suitable for hingedly mounting motor vehicle body panels, such as engine compartment hoods or bonnets for improved energy management.

BACKGROUND

The use of hinge assemblies to pivotally connect a panel, such as a hood or bonnet, to a vehicle body, is well known. Some hinge assemblies known for use in connecting a hood to a vehicle body are operative to allow movement of the hood relative to the vehicle body in more than one way, i.e., in at least one direction or degree of movement additional to the standard opening and closing movement of the hood. An example of such a hinge assembly is seen in U.S. Pat. No. 4,839,941 to Orlando, which discloses a hinge that provides for forward movement of a hood with respect to an automobile body in addition to standard upward and downward movement of the hood. Other types of hood movement with respect to the vehicle body in addition to standard upward and downward movement are known to those skilled in the art.

Known hinges, however, do not adequately address the need for multiple modes of operation. In particular, there is a need for improved hinges that serve to hingedly mount a motor vehicle hood or other body panel during normal operation, and to facilitate absorption or dispersion of the energy of impact in the event of certain impacts against the mounted body panel. In certain types of vehicle collisions, force is applied to the hinge assembly mounting a body panel. Typical fixed hinge assemblies do not adequately absorb or distribute the energy of impacts.

It is therefore an object of the present disclosure to provide new and improved hinge members and hinge assemblies. It is a particular object of at least certain embodiments of the hinge assemblies disclosed below to facilitate vehicle body panel mounting, especially hood mounting, with good energy management.

SUMMARY

In accordance with one aspect, a hinge member comprises a mounting portion having a mounting surface suitable to be secured to a surface of a panel, e.g., a vehicle body panel, and an extension portion having a fixed orientation relative to the mounting portion of the hinge member. The extension portion has a pivot-receiving slot defining a substantially circular hinge pivot hole having a diameter and operative to receive a hinge pivot, and a slot portion extending from the hinge pivot hole. At least a portion of the pivot-receiving slot has a lateral dimension smaller than the diameter of the hinge pivot hole.

As disclosed further below, preferred embodiments of the hinge member receive a hinge pivot in the hinge pivot hole during a first mode of operation, typically the intended or normal mode of operation. In a second mode of operation, such as upon application of certain force greater than normal force to the hinge, the hinge pivot or at least a central pivot pin of the hinge pivot moves into the slot portion of the pivot-receiving slot. The passage of the hinge pivot into the slot portion or the movement of the panel hingedly mounted by the hinge member, or both, facilitate, i.e., provide or enable, good management of energy, such as the energy of impact against the panel.

In accordance with certain preferred embodiments, the pivot-receiving slot of the extension portion of the hinge member further has a neck portion between the substantially circular hinge pivot hole and the slot portion. The neck portion has a lateral dimension smaller than the diameter of the hinge pivot hole, but generally adequate, optionally with a degree of deflection, i.e., flexure of the walls or edges of the slot, to pass a central pivot pin from the hinge pivot hole to the slot portion. In accordance with certain preferred embodiments, the edges of the slot portion at the hinge pivot hole, e.g., a neck portion as just disclosed, are operative to shear through a bushing surrounding a central pivot pin as the pin passes into the slot portion. In order to provide such desired flexure of the pivot-receiving slot, the extension portion of the hinge member preferably further defines at least one flexure slot extending substantially parallel to the pivot-receiving slot and proximate to the neck portion, between the substantially circular hinge pivot hole and the slot portion.

In accordance with another aspect, a hinge assembly comprises a first hinge member as disclosed above, pivotally joined to a second hinge member by a hinge pivot. The hinge pivot comprises a hinge pivot pin in a pivot pin bushing. Further details and certain preferred embodiments of the hinge assemblies disclosed here are described below.

Additional aspects and features of the hinge apparatus and methods of their manufacture and use will be understood from the following detailed description of certain preferred embodiments.

BRIEF DESCRIPTION OF THE DRAWINGS

The following detailed description of certain preferred embodiments of the hinge members and hinge assemblies disclosed here will refer to the appended drawings in which:

FIG. 2 is perspective view of the hinge assembly of FIG. 1 in the normal or default position;

FIG. 3 is a perspective view of the hinge assembly of FIG. 1 in the forced or actuated position.

DETAILED DESCRIPTION OF CERTAIN PREFERRED EMBODIMENTS

Figure 1:
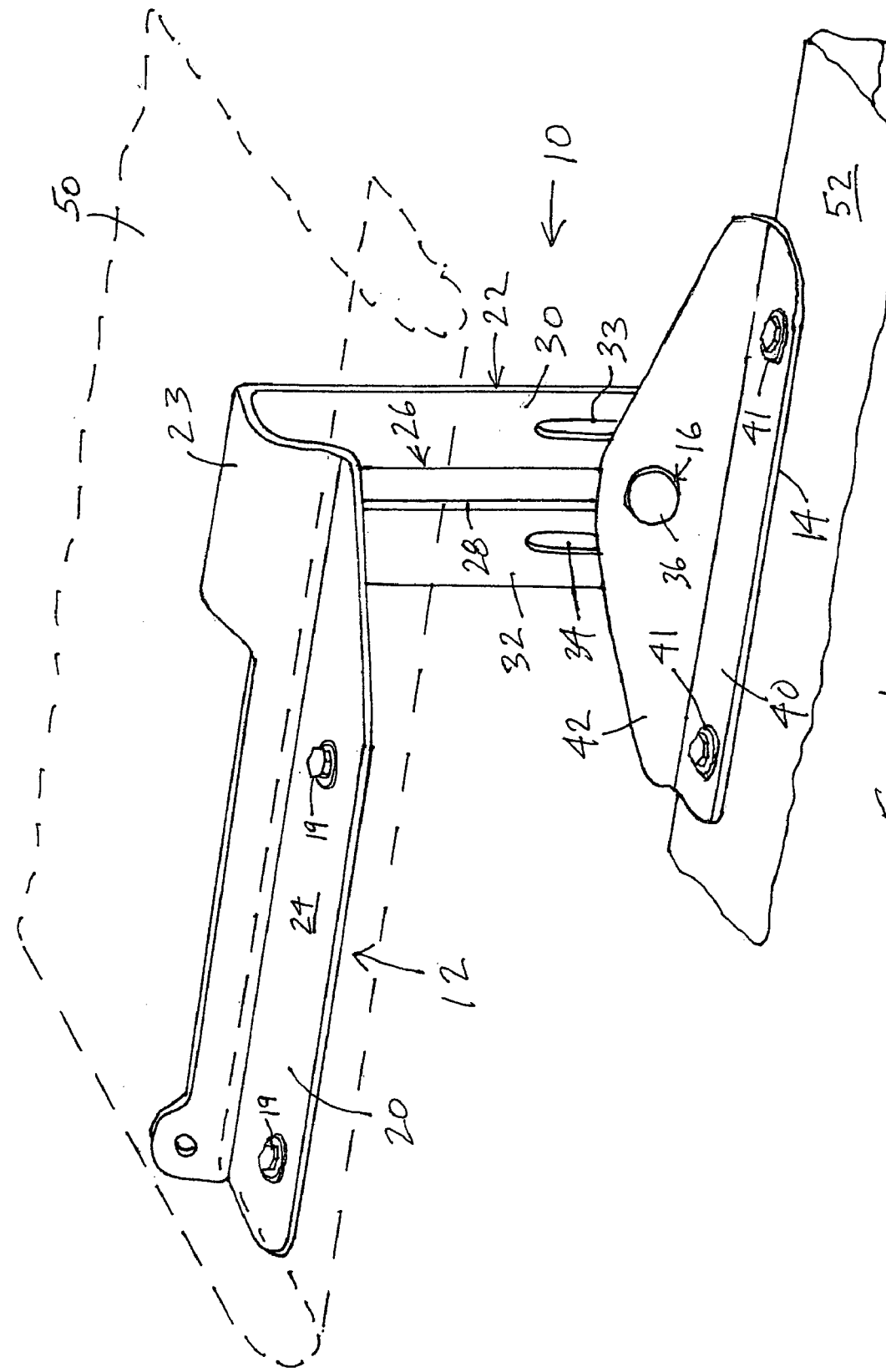
FIG. 1 is a perspective view, partially broken away, of a motor vehicle hood hinge assembly in accordance with a preferred embodiment, shown in assembly with a vehicle hood and vehicle body member.

Although specific preferred embodiments of the hinge members and hinge assemblies disclosed above are now described below as vehicle hood hinge embodiments, it should be understood that such embodiments are exemplary and serve to illustrate the principles disclosed. Other uses of the new hinge assemblies are within the scope and spirit of the present disclosure. For example, the new hinge assemblies can be used to connect a vehicle door to a vehicle body. Alternatively, the hinge assembly can be used to connect a vehicle trunk lid to a vehicle body. Other uses for the disclosed hinge assemblies will become apparent from the following discussion. Various changes and modifications to the specific embodiments discussed below will become obvious to those skilled in the art in view of the present disclosure and are deemed to be within the true spirit and scope of the invention as further defined in the appended claims.

In keeping with traditional patent usage, the terms "a," "an," and "the" are used here to mean, and should be understood to mean "one or more" unless otherwise stated or a contrary meaning is made clear from the particular context. Thus, such terms include the singular and the plural.

It should be understood that directional terms used here refer to the direction shown in the drawings, unless otherwise clear from context.

Preferred embodiments of the hinge assemblies disclosed here are operative to facilitate good energy management, e.g., good absorption, dispersion and/or distribution of energy from at least certain types of impacts against the panel or other object mounted by the hinge. For example, when such preferred embodiments of the hinge assembly are used to mount a vehicle hood to a vehicle body, the benefits of such preferred embodiments can be seen in the event of a front-end collision with a pedestrian. In such collisions, a pedestrian may be first lifted upward and then land on the hood near the windshield where the hood is hinged to the vehicle body. A hood hingedly mounted by means of a hinge assembly in accordance with the aforesaid preferred embodiments will collapse upon impact, thereby absorbing and/or distributing or dispersing the energy of impact and lessening the damage resulting from the collision. The hinge pivot is forced from the hinge pivot hole, preferably with shearing of a bushing of the hinge pivot, allowing the mounting point of the hood to travel relative to the mounting point on the vehicle body. The hood, therefore, can better yield under the weight of impact. In alternative embodiments, for example, the trunk lid of a vehicle is hingedly mounted by hinge assemblies in accordance with this disclosure, thereby facilitating good energy management by allowing similar movement of the trunk lid relative to the vehicle body under sufficient force. Further understanding of the principles of energy management facilitated by preferred embodiments of the hinge assemblies disclosed here will be obtained from the discussion below with reference to the appended drawings.

As disclosed above, the mounting portion of the hinge member has a mounting surface suitable to be secured to a surface of a panel, such as to a suitable surface of a vehicle hood, e.g., to a reinforcement plate of the hood. In certain preferred embodiments, the mounting surface is a generally planar mounting surface. As used here, the term "generally planar mounting surface" means that the surface of the mounting portion is generally flat or somewhat curvo-planar, being either regular or irregular in configuration, with or without through-holes to receive mounting bolts or other fasteners, locator pins or nubs, contours to accommodate corresponding contours of the hood, etc. The plane of the mounting surface is an imaginary plane in which it lies generally and not necessarily with any high degree of precision.

The extension portion of the hinge member is disclosed above to have a fixed orientation relative to the mounting portion. As such, it may be somewhat flexible or bendable under sufficient force, but is not pivotally or hingedly mounted to the mounting portion. Typically, the extension portion and mounting portion of the hinge member are formed as an integrated unit or as a unitary, i.e., one-piece, unit. They may be formed together, for example, as a single stamping, forging, casting or the like, or may be formed separately and then welded or otherwise joined together. The pivot-receiving slot of the extension portion is disclosed above as defining a substantially circular hinge pivot hole operative to receive the hinge pivot, and a slot portion extending from the hinge pivot hole. It should be understood that the hinge pivot hole is substantially circular in that a major portion of its periphery has a circular shape. Typically, the hinge pivot hole is not a full or complete circle, rather, being open at the slot portion that extends from it to facilitate the hinge pivot traveling from the hinge pivot hole into the slot portion upon application of sufficient force. As used here, the application of sufficient force should be understood to mean force of sufficient magnitude in a direction extending along the slot portion of the pivot-receiving slot. It is further disclosed above that in certain preferred embodiments of the hinge member, there is a neck portion at the juncture of the hinge pivot hole and the slot portion. Such a neck portion, or constriction or narrowing between the opposite sides of the slot, can function to retain the pivot pin in the hinge pivot hole in the absence of sufficient force, i.e., against force levels less than a design force for collapse of the hinge. The lateral dimension of the neck portion, i.e., the dimension of the gap defined by the neck portion, measured in the plane of the slot portion in a direction substantially perpendicular to the longitudinal direction of the slot portion, is, in certain preferred embodiments, less than the lateral dimension of the slot portion that follows it. In certain preferred embodiments, wherein the hinge pivot comprises a jacketed or unjacketed polymeric, e.g., elastomeric, bushing around a central pin, e.g., a metal rod or rivet, the edges of the slot at the neck portion can serve to shear the bushing of the hinge pivot when the aforesaid sufficient force is applied, allowing the hinge pivot pin to pass the neck portion into the slot portion. The diameter of the hinge pivot hole in such embodiments typically is sized to receive and capture the hinge pivot with its bushing intact, and the lateral dimension of the slot portion is substantially equal to the diameter of the hinge pivot pin.

It is further disclosed that in embodiments where the mounting surface is a generally planar surface, the slot portion extends from the hinge pivot hole in a longitudinal direction passing through the plane of the mounting surface of the mounting portion. This should be understood to mean that the longitudinal axis of the slot portion of the pivot-receiving slot of the extension portion of the hinge member intersects the aforesaid general plane of the mounting surface of the mounting portion of the hinge member. Preferably, the longitudinal axis of the slot portion intersects the plane of the mounting surface substantially at right angles, i.e., it is generally orthogonal or normal to the plane of the mounting surface. It should be understood that the slot portion typically does not pass through the mounting portion itself, and rather only through the imaginary plane of the mounting surface. Typically the slot portion extends from below the mounting surface to above it, along a line offset from the mounting surface. Typically, in the normal configuration, i.e., before the hinge has experienced sufficient force to move the hinge pin from the hinge pivot hole into the slot portion, the slot portion, hinge pivot hole and neck portion are all co-planar, lying in a plane substantially perpendicular to the plane of the mounting surface.

Referring now to FIGS. 1-4, hinge assembly 10 is seen to connect a vehicle hood 50 to a vehicle body 52. Hinge assembly 10 is seen to comprise a first hinge member 12, a second hinge member 14 and a hinge pivot 16 pivotally interconnecting the first and second hinge members. While in the illustrated embodiment the first hinge member 12 is attached to the hood and the second hinge member 14 is attached to the vehicle body, it is within the scope and spirit of the present disclosure that the first hinge member 12 can be reversed with the second hinge member 14. Typically, multiple such hood hinge assemblies, such as a pair of hood hinge assemblies, are used to mount a hood to the vehicle body, e.g., a first hinge assembly on the driver side and a second hinge assembly on the passenger side. Typically, the multiple hinge assemblies are substantially identical, symmetrical, or symmetrically opposite to each other.

The first hinge member 12 comprises a mounting portion 20 and an extension portion 22. The mounting portion 20 is seen to have a mounting surface 24. First hinge member 12 is secured to hood 50 by fasteners, such as bolts 19, which extend through apertures or slots 21 formed in mounting surface 24. In certain preferred embodiments, mounting surface 24 is a generally planar surface.

Extension portion 22 is seen in the illustrated embodiment to be unitary with the mounting portion 20, being connected by bridge portion 23, so that extension portion 22 has a fixed orientation relative to mounting portion 20. Extension portion 22 has a pivot-receiving slot 26, defining a hinge pivot hole 27 and slot portion 28. First side 30 and a second side 32 of the extension portion 22 each is seen to have a flexure slot 33, 34, respectively, to allow for deformation of extension portion 22 upon impact. Extension portion 22 forms hinge pivot hole 27, as noted above, which receives hinge pivot 16. Hinge pivot 16 includes a hinge pivot pin 36 formed of a metal rod or rivet, within a polymeric bushing 38. The hinge pivot 16 pivotally joins first hinge member 12 to second hinge member 14. A neck portion 39 is located at the end of slot portion 28 where slot portion 28 meets pivot hole 27. Neck portion 39 serves to retain hinge pivot 16 in pivot hole 27. Upon application of sufficient force, however, hinge pivot 16 will pass through neck portion 39 such that hinge assembly 10 can collapse for good energy management. In certain preferred embodiments, neck portion 39 is formed of a pair of lands 35, one each on opposing sides of slot portion 28.

Second hinge member 14 is seen to comprise a generally planar mounting surface 40, and a pivot flange 42 extending at substantially right angles to mounting surface 40. Second hinge member 14 is secured to vehicle body 52 by fasteners, such as bolts 41, that extend through apertures 43 formed in second hinge member 14. Hinge pivot pin 36 of hinge pivot 16 is seen to be mounted through an aperture formed in pivot flange 42.

Referring specifically to FIGS. 2 and 3, the differences can clearly be seen between the normal, or default, condition of hinge assembly 10 (as seen in FIG. 2) and the actuated, or collapsed, condition (as seen in FIG. 3). In FIG. 2 hinge pivot 16 is seated in hinge pivot hole 27. In contrast, in a collapsed condition illustrated in FIG. 3, pivot pin bushing 38 has been sheared by hinge pivot 16 passing through neck portion 39, and hinge pivot pin 36 is in slot portion 28. It would be appreciated that even in the collapsed position, hinge pivot pin 36 is captured by extension portion 22, such that hood 50 is still held to the vehicle body 52. It is to be appreciated that first side 30 and second side 32 of extension portion 22 may be deformed when the hinge assembly is in the collapsed condition, especially in the area of flexure slots 33 and 34, under certain conditions of impact.

It will be appreciated by those skilled in the art, given the benefit of this disclosure, that the first and second hinge members may be formed with any configuration suitable to the intended use of the hinge assembly. Thus, in certain embodiments, mounting surface 40 of second hinge member 14 may be flat or curvo-planar, regular or irregular in configuration, and oriented at any angle (or no angle) to pivot flange 42. In certain embodiments wherein the second hinge member is intended to be mounted to a horizontal surface, for example in an engine compartment of a motor vehicle, mounting surface 40 may be bent or otherwise have a configuration which is not generally planar, for example having a bend of about 90° from one end of mounting surface 40 to the other. In certain preferred embodiments, second hinge member 14 is mounted to the rear of an engine compartment of a motor vehicle, in an area joining the base of the vehicle windshield. Both the first hinge member 12 and the second hinge member 14 can be mounted to the vehicle by rivets, bolts, bonding, welding, or other suitable fastening means, numerous types of which are well known to those skilled in the art.

The dimensions of the various components of hinge assembly 10 will depend in large part on the intended use of the hinge assembly. In a typical motor vehicle application, a pair of such hinge assemblies is used to mount a vehicle hood to other structural components of the vehicle. The axial dimension of slot portion 28 of a typical pivot-receiving slot 26 formed by extension portion 22 may be, by way of non-limiting example, between about 60 mm and 100 mm, preferably between about 70 mm and 90 mm, for example about 80 mm, with a lateral dimension as large as or larger than the pivot pin diameter. In such embodiments, the axial dimension of flexure slot 33, 34 may, by way of non-limiting example, be about 20 mm to 35 mm, for example about 32 mm, with a lateral dimension large enough to accommodate expansion of the neck portion during hinge collapse, by way of non-limiting example, about 3-7 mm, e.g., 5 mm, for a pivot pin having a diameter of about 9-11 mm. In such embodiments, the neck portion may, by way of non-limiting example, be between about 7-11 mm, e.g., about 9 mm, but necessarily smaller than the diameter of the pivot pin. Each land, that is, the material between the neck portion and each flexure slot, in such embodiments, may have a lateral dimension between about 5 mm and 9 mm, for example about 7 mm.

Suitable materials for forming the various components of hinge assembly 10 will be apparent to those skilled in the art, given the benefit of this disclosure. First hinge member 12 and second hinge member 14 are preferably formed of steel, e.g., SAE 1008 or SAE 1010 steel or, optionally, high strength steel if needed for the intended use. Suitable methods for forming such components also will be apparent to those skilled in the art, given the benefit of this disclosure. Such methods include, for example, stamping, casting, forging, molding, etc. Additional suitable materials and manufacturing techniques applicable to the hinge assembly disclosed here would be apparent to those skilled in the art, given the benefit of this disclosure.

Figure 4:
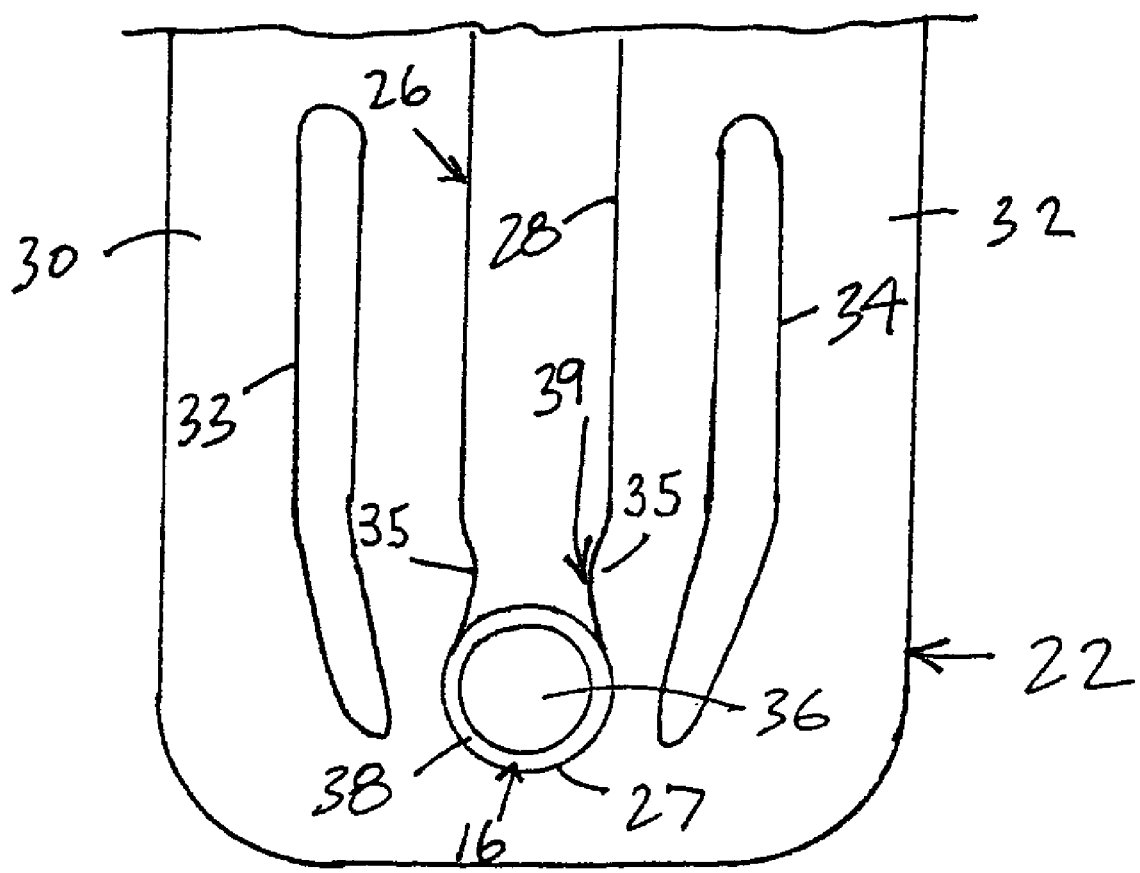
FIG. 4 is an enlarged view of a portion of a first hinge member of the hinge assembly of FIG. 1.

As best seen in FIG. 4, the hinge pivot 16 comprises hinge pivot pin 36 within pivot pin bushing 38. Preferably, pivot pin bushing 38 is shearable, that is, it is sheared from hinge pivot pin 36 upon collapse of hinge assembly 10 due to application of the aforesaid sufficient force. The bushing serves to reduce friction with the hinge pivot hole 27 and/or to provide shock absorption or damping to reduce so called "NVH," i.e., overall noise, vibration and harshness in the vehicle during operation. In certain preferred embodiments, the bushing is non-circular, having an opening corresponding to neck portion 39 where hinge pivot hole 27 opens to slot portion 28. Numerous suitable configurations for pivot pin bushing 38 will be apparent to those skilled in the art, given the benefit of this disclosure. Exemplary polymeric materials include elastomer materials, such as natural or synthetic rubber. Alternatively, the bushing may be made of a polymeric material with a PTFE-coating (commercially available from DuPont Company under the trade name TEFLON). Other suitable polymeric materials include thermoplastics such as nylon, polyacetals, polypropylene, etc. Optionally, the bushing is jacketed, for example, having an outer metal or polymeric jacket or backing, a mesh-backing, or the like in accordance with techniques known to those skilled in the art. The pivot pin bushing can be made by any of numerous suitable techniques whose applicability would be apparent to those skilled in the art given the benefit of this disclosure. Exemplary methods for producing the bushing include extruding or molding of the polymeric material. The hinge pivot pin, as noted above, can be formed of any material having suitable strength for the intended application, such as for example, a metal rivet, bolt, rod or the like.

In certain embodiments suitable for motor vehicle applications as described above, specifically, for the mounting of a hood to a motor vehicle body, the aforesaid sufficient force for moving the hinge pivot pin from the hinge pivot hole into the slot portion of the pivot-receiving slot by way of non-limiting example is a force of about 400-700 lbs., e.g., about 525 lbs, measured in the direction of collapse. Such force is measured as a vector from the hinge pivot pin through the neck portion between the hinge pivot hole and the slot portion. In accordance with certain such embodiments, the hinge assembly is operative to shear the pivot pin bushing under the same force levels.

Certain characteristics and advantages of the hinge members and hinge assemblies disclosed here have been set forth in the foregoing description, together with details of the structure and function of various embodiments. The disclosure is illustrative only, as the disclosed hinge members and hinge assemblies may be used in other applications and with different and/or additional features, e.g., for vehicle doors, vehicle trunk lids, and other devices. Alternative embodiments, including, for example, asymmetrical hinge assemblies, are also within the scope and spirit of the present disclosure. Embodiments incorporating other changes, especially in function, intended use, shape, size and arrangement of parts, within the principles of the foregoing disclosure are intended to be covered by the following claims to the full extent indicated by the meaning of the terms in which the claims are expressed.

What is claimed is:

1. A hinge member for a panel comprising:
    a hinge pivot;
    a mounting portion having a mounting surface suitable to be secured to a surface of the panel; and
    an extension portion having a fixed orientation relative to the mounting portion and a pivot-receiving slot defining:
        a substantially circular hinge pivot hole having a diameter and receiving the hinge pivot, and
        a slot portion extending from the hinge pivot hole;
    wherein the mounting surface is generally planar and the pivot-receiving slot extends in a longitudinal direction passing through the plane of the mounting surface, and at least a portion of the pivot-receiving slot defines a neck portion between the substantially circular hinge pivot hole and another portion of the pivot-receiving slot, the neck portion having a lateral dimension smaller than the diameter of the hinge pivot hole.

2. The hinge member of claim 1, wherein the neck portion is formed of a pair of lands, one each located on opposing sides of the pivot-receiving slot.

3. The hinge member of claim 1, wherein the lateral dimension of the neck portion of the pivot-receiving slot is smaller than a lateral dimension of the other portion of the pivot-receiving slot.

4. The hinge member of claim 1, wherein the extension portion defines at least one flexure slot extending substantially parallel to the pivot-receiving slot and proximate to the neck portion between the substantially circular hinge pivot hole and the other portion of the pivot-receiving slot.

5. The hinge member of claim 4, wherein the extension portion defines two flexure slots on opposite sides of the pivot-receiving slot.

6. The hinge member of claim 1, further comprising a bridge portion connected to the mounting portion and the extension portion and configured to provide travel of the extension portion with respect to the mounting portion along the longitudinal direction of the extension portion upon an impact.

7. The hinge member of claim 1, wherein the extension portion defines a flexure slot extending substantially parallel to the pivot-receiving slot and proximate to the neck portion between the substantially circular hinge pivot hole and the other portion of the pivot-receiving slot.

8. A hinge member for a vehicle body panel comprising:
    a hinge pivot;
    a mounting portion having a mounting surface suitable to be secured to a surface of the vehicle body panel; and
    an extension portion having a fixed orientation relative to the mounting portion and a pivot-receiving slot defining:
        a substantially circular hinge pivot hole having a diameter and receiving the hinge pivot,
        a slot portion extending from the hinge pivot hole, and forming a neck portion between the substantially circular hinge pivot hole and the remainder of the slot portion, the neck portion having a lateral dimension smaller than the diameter of the hinge pivot hole; and
    first and second flexure slots extending substantially parallel to and on opposite sides of the pivot-receiving slot, a portion of each flexure slot being proximate to the neck portion.

9. The hinge member of claim 8, wherein the lateral dimension of the neck portion is smaller than a lateral dimension of the remainder of the slot portion.

10. A hinge assembly for a vehicle body panel comprising, in combination:
    a pair of hinge members including a first hinge member and a second hinge member;
    a hinge pivot joining the first hinge member to the second hinge member, the hinge pivot comprising a hinge pivot pin in a pivot pin bushing, the hinge pivot pin having a pin diameter, the first hinge member comprising:
        a mounting portion having a mounting surface suitable to be secured to a surface of the vehicle body panel, and
        an extension portion having a fixed orientation relative to the mounting portion, with a pivot-receiving slot defining a substantially circular hinge pivot hole rotatably receiving the hinge pivot and a slot portion extending from the hinge pivot hole and having a lateral dimension sufficiently large to receive at least the hinge pivot pin, at least a portion of the slot portion having a lateral dimension smaller than the diameter of the hinge pivot hole.

11. The hinge assembly of claim 10, wherein at least the hinge pivot pin of the hinge pivot is operative to move from the hinge pivot hole into the slot portion of the pivot-receiving slot when the hinge pivot is under force of at least 400 pounds in a direction toward the slot portion.

12. The hinge assembly of claim 10, wherein the pivot pin bushing in the hinge pivot hole is operative to shear when the hinge pivot is under force of at least 400 pounds in a direction toward the slot portion.

13. The hinge assembly of claim 10, wherein the pivot-receiving slot further defines a neck portion between the substantially circular hinge pivot hole and a remaining portion of the slot portion, the neck portion having a lateral dimension smaller than the diameter of the hinge pivot hole.

14. The hinge assembly of claim 13, wherein the lateral dimension of the neck portion is smaller than the lateral dimension of the remaining portion of the slot portion.

15. The hinge assembly of claim 13, wherein the neck portion is formed of a pair of lands, one each located on opposing sides of the pivot-receiving slot.

16. The hinge assembly of claim 10, wherein the hinge pivot pin of the hinge pivot comprises a metal pin and the pivot pin bushing of the hinge pivot comprises elastomer around the metal pin.

17. The hinge assembly of claim 16, wherein the pivot pin bushing further includes a jacket around the elastomer.

18. The hinge assembly of claim 10, wherein the pivot pin bushing is a thermoplastic material selected from the group consisting of polytetrofluoroethylene, nylon, polyacetals, and polypropylene.

19. The hinge assembly of claim 10, wherein the pivot pin bushing is made from one of a polymeric material and metal.

20. The hinge assembly of claim 10, wherein the hinge pivot pin is in a fixed position relative to the second hinge member.

21. A method of providing a collapsible hinge assembly for a vehicle body panel comprising the following steps:
   providing a hinge assembly having a mounting portion to be secured to a surface of the vehicle body panel, the hinge assembly having a hinge pivot and an extension portion having a fixed orientation relative to the mounting portion;
   forming a pivot-receiving slot in the extension portion defining:
   a substantially circular hinge pivot hole having a diameter and
   a slot extending from the hinge pivot hole; and
   sizing at least a portion of the pivot-receiving slot such that it has a lateral dimension smaller than the diameter of the hinge pivot hole, wherein, upon the application of a sufficient force, the hinge pivot pin moves into the slot of the pivot-receiving slot with deformation of the extension portion.

22. The method of claim 21, wherein at least some of the force is absorbed, dispersed or distributed.

23. A hinge member for a panel comprising:
   a hinge pivot for normally pivoting the panel about a hinge axis;
   a mounting portion having a mounting surface suitable to be secured to a surface of the panel; and
   an extension portion having a fixed orientation relative to the mounting portion and a pivot-receiving slot defining:
      a substantially circular hinge pivot hole having a diameter and receiving the hinge pivot, and
      a slot portion extending from the hinge pivot hole;
   wherein the mounting surface is generally planar and the pivot-receiving slot extends in a longitudinal direction passing through the plane of the mounting surface, and at least a portion of the pivot-receiving slot defines a neck portion between the substantially circular hinge pivot hole and another portion of the pivot-receiving slot, the neck portion having a lateral dimension smaller than the diameter of the hinge pivot hole.

* * * * *